United States Patent [19]

Auracher

[11] 4,048,591
[45] Sept. 13, 1977

[54] INTEGRATED OPTICAL MODULATOR

[75] Inventor: Franz Auracher, Munich, Germany

[73] Assignee: Siemens Aktiengesellschaft, Berlin & Munich, Germany

[21] Appl. No.: 573,553

[22] Filed: May 1, 1975

[30] Foreign Application Priority Data

May 2, 1974 Germany .................. 2421285

[51] Int. Cl.² .................... G02B 5/14; H01S 3/00
[52] U.S. Cl. ................. 332/7.51; 350/96 WG; 350/160 R
[58] Field of Search ............ 332/7.51; 350/96 C, 350/96 WG, 160 R, 161; 250/227

[56] References Cited

U.S. PATENT DOCUMENTS

| 3,753,157 | 8/1973 | Ash et al. | 350/96 C |
| 3,785,717 | 1/1974 | Croset et al. | 350/96 WG |
| 3,822,927 | 7/1974 | Zernike | 350/96 WG |
| 3,850,503 | 11/1974 | Riseberg et al. | 350/96 WG |
| 3,883,220 | 5/1975 | Taylor | 350/96 C |
| 3,920,314 | 11/1975 | Yajima | 350/96 C |

FOREIGN PATENT DOCUMENTS

| 1,373,956 | 11/1974 | United Kingdom | 350/96 C |

OTHER PUBLICATIONS

Auracher et al., "New Directional Coupler for Integrated Optics," 11/74, pp. 4997-4999, J.A.P., vol. 45, No. 11.

Taylor, "Optical Switching and Modulation in Parallel...", 7/73, pp. 3257-3262, J.A.P., vol. 44, No. 7.

*Primary Examiner*—Nelson Moskowitz
*Attorney, Agent, or Firm*—Hill, Gross, Simpson, Van Santen, Steadman, Chiara & Simpson

[57] ABSTRACT

An integrated optical modulator for modulating optical signals in dielectric wave guides characterized by at least one wave guide being disposed on a surface of a substrate and having an upper surface separated from a second wave guide disposed thereon by a dielectric, low loss film. The substrate supports at least a pair of electrodes on either side of the one wave guide and at least one of the wave guides is of an electro-optical material so that an application of a potential on the electrodes changes the propagation characteristic or constant of the one wave guide. In one embodiment of the invention, only a pair of wave guides are utilized. In another embodiment of the invention, three wave guides are utilized and two of the wave guides are provided in spaced parallel arrangement and are either separated from an upper surface of the third wave guide by the film or are disposed beneath the third wave guide and separated therefrom by the film.

4 Claims, 6 Drawing Figures

INTEGRATED OPTICAL MODULATOR

BACKGROUND OF THE INVENTION

1. Field of the Invention

The present invention is directed to an integrated optical modulator for modulation of optical signals in dielectric wave guides which are disposed on a substrate and with at least one of the wave guides consisting of electro-optical material whose propagation characteristic or constant is changeable by the application of a potential on electrodes disposed on the substrate.

2. Prior Art

If two or more dielectric, monomode wave guides are disposed in parallel relationship on a substrate for a sufficient length, a periodic exchange of energy may take place between the two wave guides. In the case of these two coupled wave guides, the greatest interaction between the two wave guides occurs when the phase velocity and the field distribution in the wave guides are matched and the coupling structure is loss free. If at the beginning of the coupling length all of the energy is conducted in one wave guide, a part of the energy, which under the above-mentioned optimum conditions is the entire energy, is at periodic intervals coupled to the second wave guide and then coupled or conducted back to the first wave guide.

If one produces one or both wave guides from an electrooptical material, an electro-optical amplitude modulator or switch can be produced with this type of structure. For this purpose, the coupling length is dimensioned to be such that when no electrical field is applied, the entire or full energy is coupled to the second wave guide. As a result of an application of an electrical field to one or both of the wave guides, it is then possible to make the phase velocity in the two wave guides to be different and thus to achieve a modulation of the coupled energy. When the two wave guides have a phase difference of 180° over the entire coupling length, the coupled energy is zero.

A practical embodiment of such a modulator is described in an article by H. F. Taylor, "Optical Switching and Modulation in Parallel Dielectric Waveguides", *Journal Applied Physics,* vol. 44, No. 7, July 1973, pages 3257–3262. The modulator described in this article has a pair of wave guides arranged next to each other on a substrate, which wave guides are simultaneously modulated. The coupling strength is determined by the spacing between the two wave guides and the difference in the index of refraction between the core of each wave guide and the wave guide material surrounding the core. However, the permissible tolerances for the spacing between the two wave guides are extremely narrow. For example, with a coupling length of 4 mm, a deviation of 1000 angstroms in the spacing between the pair of wave guides can lead to a change of approximately 20% in the amount of coupled energy.

SUMMARY OF THE INVENTION

The present invention is directed to providing an integrated optical modulator having at least two wave guides with at least one of the wave guides being of an electro-optical material in which the required tolerances in positioning the wave guides on the substrate can be more easily obtained so that problems of changes in the coupled energy due to tolerance fluctuations can be avoided. To accomplish this, the modulator comprises a substrate having a surface and being of a material having an index of refraction $n_3$, at least two parallel extending electrodes being disposed in spaced relationship on the surface, a first wave guide disposed on said surface between two of the parallel extending electrodes and extending parallel thereto, said first wave guide having an upper surface and an index of refraction $n_1$, a dielectric, low loss film having an index of refraction $n_4$ and having a width at least as large as the width of said upper surface, said film being disposed on the upper surface of the first wave guide and covering same, and a second wave guide having an index of refraction $n_2$, said second wave guide being disposed on said film, said indicies of refraction of the wave guides and film having a relationship of $n_4 < n_1, n_2$, and at least one of said first and second wave guides being an electrooptical material so that an application of a potential on said two electrodes changes the propagation characteristic or constant of at least said one wave guide.

In one embodiment of the invention, only two wave guides are utilized and they are selected to have identical propagation constants. In this embodiment, either the second or upper wave guide is of a material so that it is substantially unchanged by the application of a field on the first or lower wave guide or if it is of an electro-optical material, the orientation is selected so that the direction of changes in the propagation constants of the second wave guide is opposite to the direction of change in the lower wave guide.

In a second embodiment of the invention, three wave guides are utilized and the third wave guide is positioned in spaced parallel relationship to one of the first and second wave guides and the other of the first and second wave guides has a width which is equal to the sum of the widths of the third wave guide, said one wave guide and the space therebetween. Also, the film is selected to have a width equal to the said other wave guide. The two parallel extending wave guides are selected to have identical propagation with the orientation of the electro-optical material being the same. The other wave guide which is the wide wave guide may be either the first wave guide with the second and third disposed on the film or may be the second wave guide with the first and third wave guides disposed therebeneath and separated therefrom by the film.

DESCRIPTION OF THE PREFERRED EMBODIMENT

Figure 1:
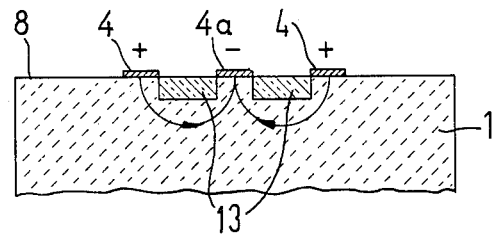
FIG. 1 is a cross-sectional view of a modulator known in the prior art.

In previously known modulators such as illustrated in FIG. 1, a substrate has a surface 8 with a pair of parallel extending wave guides 13 disposed thereon. As illustrated, each of the wave guides 13 has a rectangular cross section and is embedded in the substrate 1 so that the upper surface of each wave guide 13 is substantially co-planar with the surface 8. The surface 8 is provided with three parallel extending electrodes 4 with the center electrode 4a, which is between the two wave guides 13, being of different polarity than the outer two electrodes. If only one of the two wave guides 13 is of an electro-optical material or if both are of an electro-optical material and a potential is selectively applied on the electrodes 4, the structure of FIG. 1 becomes an electro-optical amplitude modulator or switch which will modulate the amount of the energy being coupled between the pair of parallel extending wave guides 13. In such an arrangement, the spacing between the pair of wave guides 13 is extremely critical and a small variation in the spacing between the wave guides 13 will reduce or change the amount of energy being coupled therebetween.

The principles of the present invention provide an improved modulator such as illustrated in FIGS. 2–6. Each of the modulators has a substrate 1 with an index of refraction $n_3$ and an upper surface 8.

Figure 2:
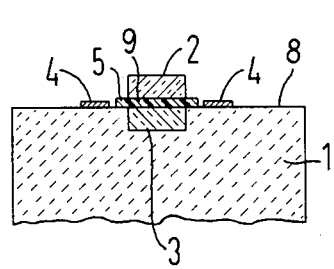
FIGS. 2, 3 and 4 are cross-sectional views of the modulators of the present invention illustrating different positions of the wave guides on the substrate.

As illustrated in FIG. 2, a first or lower wave guide 3 which has a rectangular cross section and an upper surface 9 is embedded in the substrate 1 with the upper surface 9 substantially co-planar with the surface 8. A dielectric, low loss coupling film 5, which has a width greater than the width of the upper surface 9, is disposed thereon to cover the upper surface and adjacent portions of the surface 8. A second or upper wave guide 2, which also has a rectangular cross section is disposed on the film 5 and is separated thereby from the first wave guide 3. A pair of parallel extending electrodes 4 are disposed on the surface 8 of the substrate 1 adjacent the edges of the first or lower wave guide 3 so that the stack of superimposed wave guides 2 and 3 are disposed therebetween.

The upper or second wave guide 2 has an index of refraction $n_1$ and the lower wave guide has an index of refraction of $n_2$. Preferably, both wave guides 2 and 3 have substantially the same propagation constant and in the device of FIG. 2, the lower or first wave guide 3 consists of an electro-optical material while the second wave guide 2 is constructed of a material which has no electrooptical properties. Thus, an application of a potential on the pair of electrodes 4 applies a field to the first wave guide 3 to modulate the propagation constant therein. However, the propagation constant in the second wave guide 2 will remain substantially unchanged.

As apparent from FIG. 2, the two rectangular wave guides 2 and 3 are separated by the thin film 5 which has a low index of refraction $n_4$ which is less than $n_1$ or $n_2$. Since the thickness of the film may be produced with a tolerance in the order of approximately 100 angstroms, the required narrow tolerances in the spacing between the two wave guides can be easily obtained with the construction of the device of FIG. 2.

Figure 3:
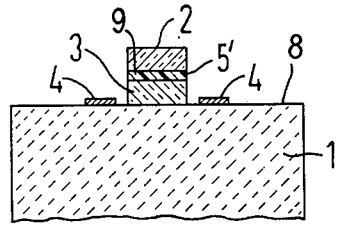

In FIG. 3, a slightly different arrangement is illustrated and similar element numbers identify identical parts. The major difference in the device of FIG. 3 is that the first wave guide 3 is disposed on the surface 8 so that its upper surface 9 is spaced thereabove. The thin low loss dielectric film 5' has a width which is substantially equal to the width of the upper surface 9.

Figure 4:
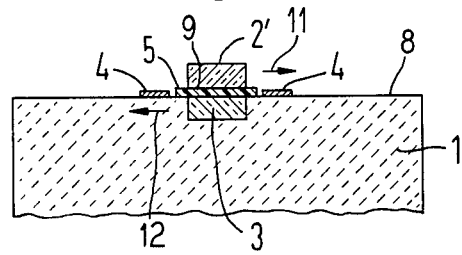
Figure 5:
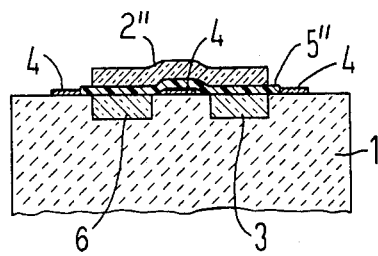
FIGS. 5 and 6 are cross-sectional views of an embodiment of the modulator of the present invention having three wave guides.

In the device illustrated in FIG. 4, the lower wave guide 3 is again embedded in the substrate with its upper surface 9 co-planar to the surface 8 of the substrate 1. The second wave guide 2' is also constructed of an electro-optical material with its optical axis oriented in a direction indicated by arrow 11. For example, if the upper wave guide is an $LiNbO_3$ crystal, the c-axis is oriented in the direction of arrow 11. While the lower or first wave guide 3 which may also be of the same electro-optical material has its optical axis oriented in the direction indicated by arrow 12. In such an arrangement, an application of the electrical field on wave guides 2' and 3 by the applying of a potential on the electrodes 4 causes the propagation constant of each of the wave guides to change in an opposite manner or direction. With such a construction, the modulator of FIG. 4 can accomplish the same amount of modulation as the modulator of FIG. 2; however, its length is only half of the required length for the modulator of FIG. 2. In addition, when the same electro-optical materials are used for both the wave guides 2' and 3, it is also possible to achieve a substantial temperature compensation for the modulator.

However, it is difficult to achieve the correct crystal orientation of the electro-optical material in both of the wave guides and it is also difficult to obtain a sufficiently accurate match in the propagation constants of the two wave guides when two different materials are used. An embodiment of the present invention (illustrated in FIGS. 5 and 6) utilizes three wave guides with the third wave guide 6 being disposed in a spaced, parallel relationship to either the first wave guide or to the second wave guide. In the device illustrated in in FIG. 5, the third wave guide 6 is embedded in the substrate 1 in spaced, parallel relationship to the first wave guide 3. The second wave guide 2'' has a width which is substantially equal to the sum of the widths of the first wave guide 3 and the third wave guide 6 plus the spacing therebetween and acts as a coupling wave guide. The second wave guide 2'' is separated from the first wave guide 3 and the third wave guide 6 by a thin dielectric, low loss film 5'' which, as illustrated, has a width slightly greater than the width of the second wave guide 2''. In addition, three electrodes 4 are placed on the substrate 1 with one electrode disposed in the space between the wave guides 3 and 6.

Figure 6:
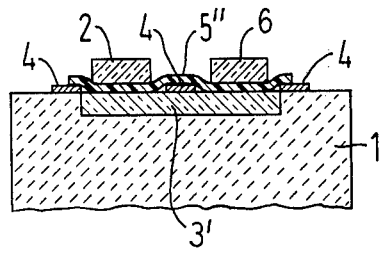

In the device of FIG. 6, the third wave guide 6 is disposed in spaced, parallel relation to the second wave guide 2. The pair of wave guides 2 and 6 are disposed on the thin dielectric layer 5'' which is received on an upper surface on the first or lower wave guide 3'. As illustrated, the lower wave guide 3' has a width which is slightly greater than the sum of the width of the wave guides 2 and 6 and the width of the space therebetween and the wave guide 3' acts as a coupling wave guide.

As in the device illustrated in FIGS. 2, 3 and 4, the coupling strength is determined by the thickness of the dielectric film 5'' and the film has an index of refraction $n_4$ which is lower than the indicies of refraction $n_1$ and $n_2$. Each of the wide or coupling wave guides 2'' or 3' serves merely to transfer the energy output coupled from the two wave guides which are separated by the film 5'' therefrom. Preferably, the wave guides 6 and 3 of FIG. 5 and the wave guides 2 and 6 of FIG. 6 are produced from the same electro-optical materials having the same orientation whereas the coupling wave guides 2'' and 3' do not need to be of an electro-optical material. The spacing between the guides 6 and 3 of FIG. 5 and the guides 2 and 6 of FIG. 6 is selected so that a direct coupling therebetween without transfer through the coupling wave guide is negligible. Thus, the pair of narrow wave guides (either 6 and 3 or 2 and 6) will, under the most favorable circumstances, be identical and be produced in one process. If each of the three wave guides of the devices of FIGS. 5 and 6 have approximately the same propagation constants and are coupled, a periodic exchange of energy takes place between all three wave guides. It may be demonstrated that for a relative large range of propagation constants of the coupling wave guides 2" and 3', a considerable coupling of energy takes place between the wave guides 6 and 3 of FIG. 5 or 2 and 6 of FIG. 6, and that the dimensions of the coupling wave guides 2" or 3' are not critical. However, its width in any case must correspond approximately to the sum of the widths of the pair of wave guides and the spacing therebetween. The dielectric film 5" also must have at least the same width.

Because of the symmetry, the modulator in accordance with this embodiment of the invention has a good temperature compensation. This modulator also has the advantage that the coupling length can be subsequently altered by either lengthening or shortening the coupling wave guide 2" or 3'.

Although various minor modifications may be suggested by those versed in the art, it should be understood that I wish to employ within the scope of the patent granted hereon, all such modifications as reasonably and properly come within the scope of my contribution to the art.

I claim:

1. An integrated optical modulator for modulating optical signals in dielectric wave guides comprising a substrate having a surface and being of a material having an index of refraction $n_3$; at least two parallel extending electrodes being disposed in spaced relationship on said surface; a first wave guide disposed on said surface between two of said parallel extending electrodes and extending parallel thereto, said first wave guide having an upper surface and an index of refraction $n_1$; a dielectric, low loss film having an index of refraction $n_4$, said film being disposed on the upper surface of the first wave guide and covering same; a second wave guide having an index of refraction $n_2$, said second wave guide being disposed on said film, and a third wave guide being disposed in spaced, parallel relationship and adjacent one of said first and second wave guides, the other of said first and second wave guides having a width approximately equal to the sum of the widths of the third wave guide, said one wave guide and the space therebetween, said film having a width at least as large as the other wave guide so that the film separates the other wave guide from said one and third wave guides, said indices of refraction of the wave guides and film having a relationship of $n_4 < n_1, n_2$, at least said one wave guide being of an electro-optical material so that an application of a potential on said electrodes changes the propagation constants of at least said one wave guide.

2. An integrated optical modulator according to claim 1, wherein said one and third wave guides each consist of the same electro-optical material of the same orientation so that a potential applied to said electrodes changes the propagation constant in the same direction.

3. An integrated optical modulator according to claim 1, wherein said other wave guide is the first wave guide and wherein said third wave guide is disposed on said film adjacent the second wave guide.

4. An integrated optical modulator according to claim 1, wherein said other wave guide is said second wave guide and wherein the third wave guide is disposed on said substrate in spaced, parallel relation to said first wave guide.

* * * * *